US009568888B2

(12) United States Patent
Meerovitsch

(10) Patent No.: US 9,568,888 B2
(45) Date of Patent: Feb. 14, 2017

(54) INTERFACE FOR ACTUATING A DEVICE

(71) Applicant: Time Grand Limited, Kwai Chung (HK)

(72) Inventor: Alexander Meerovitsch, Kwai Chung (HK)

(73) Assignee: Time Grand Limited, Kwai Chung, N.T. (HK)

( * ) Notice: Subject to any disclaimer, the term of this patent is extended or adjusted under 35 U.S.C. 154(b) by 459 days.

(21) Appl. No.: 13/857,853

(22) Filed: Apr. 5, 2013

(65) Prior Publication Data

US 2014/0301172 A1 Oct. 9, 2014

(51) Int. Cl.

*H04B 3/04* (2006.01)
*G05G 1/02* (2006.01)
*G04B 27/00* (2006.01)
*G04G 21/00* (2010.01)
*G04B 27/08* (2006.01)

(52) U.S. Cl.

CPC ............ *G04B 27/002* (2013.01); *G04B 27/08* (2013.01); *G04G 21/00* (2013.01)

(58) Field of Classification Search

CPC ....... G04B 27/08; G04B 3/043; G04B 37/106; G04B 3/048; G04B 37/103; G04B 37/10; G04B 3/041; G04B 1/08; G04B 2009/04777

USPC ......... 368/319–329; 200/335, 336, 339, 564, 200/51.13

See application file for complete search history.

(56) References Cited

U.S. PATENT DOCUMENTS 1,611,594 A * 12/1926 Knutsson ............... H01H 29/04 200/183
1,778,186 A * 10/1930 Douglas ................. B60Q 3/044 200/51.08
2,087,935 A * 7/1937 Batcheller ............ H01H 13/023 200/316
4,359,256 A * 11/1982 Gallusser ............. H01R 13/623 439/314
5,857,866 A * 1/1999 Felps ..................... H01R 13/08 439/289
7,255,473 B2 * 8/2007 Hiranuma .............. G04B 3/043 368/288

* cited by examiner

*Primary Examiner* — Xuong Chung Trans
(74) *Attorney, Agent, or Firm* — Wells St. John P.S.

(57) ABSTRACT

Actuators for a device are described. In one aspect, an actuator for a device includes a boss member adapted to engage the device, the boss member having a cylindrical body portion and a handle portion, the body portion including at least one channel engageable with a guiding plate connected with the device, wherein upon manipulation of the handle portion, the boss member is movable from an initial position to an actuating position whereby an actuating member is adapted to actuate the device.

9 Claims, 9 Drawing Sheets

INTERFACE FOR ACTUATING A DEVICE

TECHNICAL FIELD

The present invention relates to an interface for actuating a device, and particularly, although not exclusively to an interface for actuating a wrist watch.

BACKGROUND

Various personal devices such as watches, mobile phones, portable computing devices include one or more control interfaces which allow a user to control the device. These control interfaces may include one or more switches or buttons which are arranged to be manipulated by a user. These switches or buttons may be pressed, flipped, touched or otherwise manipulated by a user so that commands can be entered into the device.

The general structure of these control interfaces may include an external button or switch which is disposed on the exterior of a device's housing. These buttons are usually quite robust and is arranged to receive digital force from a user. Once these buttons or switches are manipulated by a user, the switches or buttons may transfer this force from the user's manipulation through the button to a more delicate actuator within the device housing.

Whilst these control interfaces provide a suitable method for users to control the device, these control interfaces may be a conduit for liquids or debris to enter the housing. Furthermore, some buttons or switches may protrude from a housing of the device and in turn risk being damaged during the service life of the device.

SUMMARY OF THE INVENTION

In accordance with a first aspect of the present invention, there is provided an interface for actuating a device comprising:

a boss member arranged to be extended from a shaft to receive a user's manipulation, wherein when the boss member receives the user's manipulation, the boss member is arranged to project the shaft to an actuating position arranged to actuate the device.

In an embodiment of the first aspect, the boss member is arranged to extend from the shaft when the boss member is rotated.

In an embodiment of the first aspect, the boss member is engaged to the shaft by a screw thread arrangement.

In an embodiment of the first aspect, the interface further comprises a crown arranged to at least partially enclose the boss member.

In an embodiment of the first aspect, the crown is arranged to snugly receive the boss member.

In an embodiment of the first aspect, the crown is arranged to rotate the boss member when the crown member is rotated.

In an embodiment of the first aspect, the crown is annular.

In an embodiment of the first aspect, the boss member includes an annular ring arranged to contact the crown such that the crown is able to rotate the boss member when the crown is rotated.

In an embodiment of the first aspect, the interface further includes a resilient arrangement arranged to withdraw the shaft from an actuating position.

In an embodiment of the first aspect, the resilient arrangement is a spring.

In an embodiment of the first aspect, the interface is arranged to actuate an actuator of a device.

In an embodiment of the first aspect, the shaft is arranged to contact the actuator of the device.

In an embodiment of the first aspect, the shaft is arranged to apply pressure to the actuator of the device.

In an embodiment of the first aspect, the interface is arranged to be implemented within a housing of the device.

In an embodiment of the first aspect, the actuator is housed within the housing.

In an embodiment of the first aspect, the interface is arranged to provide communication between the actuator and the exterior of the housing.

In an embodiment of the first aspect, the interface further comprises a detent arranged to resist the shaft from projecting pass a predetermined distance.

In an embodiment of the first aspect, the shaft includes a shoulder arranged to abut the detent at the predetermined distance.

In an embodiment of the first aspect, the interface includes a collar arranged to prevent the boss member from extending pass a predetermined distance from the shaft.

In an embodiment of the first aspect, the shaft is arranged to contact the actuator.

In an embodiment of the first aspect, the shaft is arranged to apply pressure to the actuator.

In an embodiment of the first aspect, the interface further comprises a sealing arrangement arranged to resist debris or liquids from travelling through the interface.

In an embodiment of the first aspect, the sealing arrangement includes at least one o-ring.

In an embodiment of the first aspect, the interface further comprises a cover arranged to at least partially cover the crown.

In an embodiment of the first aspect, the device is a wrist watch.

In an embodiment of the first aspect, the device is a phone.

In an embodiment of the first aspect, the device is a medical device.

In accordance with a second aspect of the present invention, there is provided a method of actuating a device comprising the steps of:

- rotating a crown to extend a boss from a housing of the device;
- manipulating the boss when the boss is extended from the housing of the device; and
- transmitting the manipulation received by the boss to a shaft, wherein when the manipulation is transmitted to the shaft, the shaft is arranged to actuate an actuator of the device.

In an embodiment of the second aspect, the manipulation includes a pressing action by a user.

In an embodiment of the second aspect, the crown is rotated to withdraw the boss into the housing of the device.

In an embodiment of the second aspect, the device is a watch.

In accordance with a third aspect of the present invention, there is provided an actuator for a device comprising a boss member adapted to engage the device, the boss member having a cylindrical body portion and a handle portion, the body portion comprising at least one channel engageable with a guiding plate connected with the device, wherein upon manipulation of the handle portion, the boss member is movable from an initial position to an actuating position whereby an actuating member is adapted to actuate the device.

In an embodiment of the third aspect, the at least one channel adapted to slidably receive at least one guiding member of the guiding plate.

In an embodiment of the third aspect, the boss member is adapted to move towards the device when movable from the initial position to the actuating position In an embodiment of the third aspect, the at least one channel comprises a first channel portion extending circumferentially along a cylindrical surface of the body portion.

In an embodiment of the third aspect, the first channel portion extends away from the device.

In an embodiment of the third aspect, the at least one channel further comprises a second channel portion extending longitudinally along the cylindrical surface of the body portion, the second channel portion is in spatial communication with the first channel portion.

In an embodiment of the third aspect, the guiding plate is integrally formed with the device.

In an embodiment of the third aspect, the handle portion comprises a lever.

In an embodiment of the third aspect, the actuator further comprises a biasing member for restoring the boss member from the actuating position to the initial position.

In an embodiment of the third aspect, the actuating member engages the body portion thereby actuating the device when the boss member is in the actuating position.

In an embodiment of the third aspect, the device is a wrist watch.

In accordance with a fourth aspect of the present invention, there is provided an actuator for a device comprising a boss member adapted to engage the device, the boss member having a body portion and a handle portion, the handle portion comprising at least one wing member movable between a first configuration in which the at least one wing member is in proximity to the device, and a second configuration in which the at least one wing member is extending away from the device, wherein upon manipulation of the at least one wing member when in the second configuration, the boss member is movable from an initial position to an actuating position whereby an actuating member is adapted to actuate the device.

In an embodiment of the fourth aspect, the at least one wing member is substantially coplanar with the body portion when in the first configuration.

In an embodiment of the fourth aspect, the at least one wing member is substantially coplanar with the device when in the first configuration.

In an embodiment of the fourth aspect, the at least one wing member extends substantially transverse to the body portion when in the second configuration.

In an embodiment of the fourth aspect, the at least one wing member extends substantially transverse to the device when in the second configuration.

In an embodiment of the fourth aspect, the at least one wing member is connected with the body portion via a pivot joint.

In an embodiment of the fourth aspect, the actuator further comprises a detent for limiting movement of the pivot joint.

In an embodiment of the fourth aspect, the detent comprises at least one ball bearing.

In an embodiment of the fourth aspect, the actuator further comprises a biasing member for restoring the boss member from the actuating position to the initial position.

In an embodiment of the fourth aspect, the actuating member engages the body portion thereby actuating the device when the boss member is in the actuating position.

In an embodiment of the fourth aspect, the actuator further comprises a sealing member.

In an embodiment of the fourth aspect, the device is a wrist watch.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
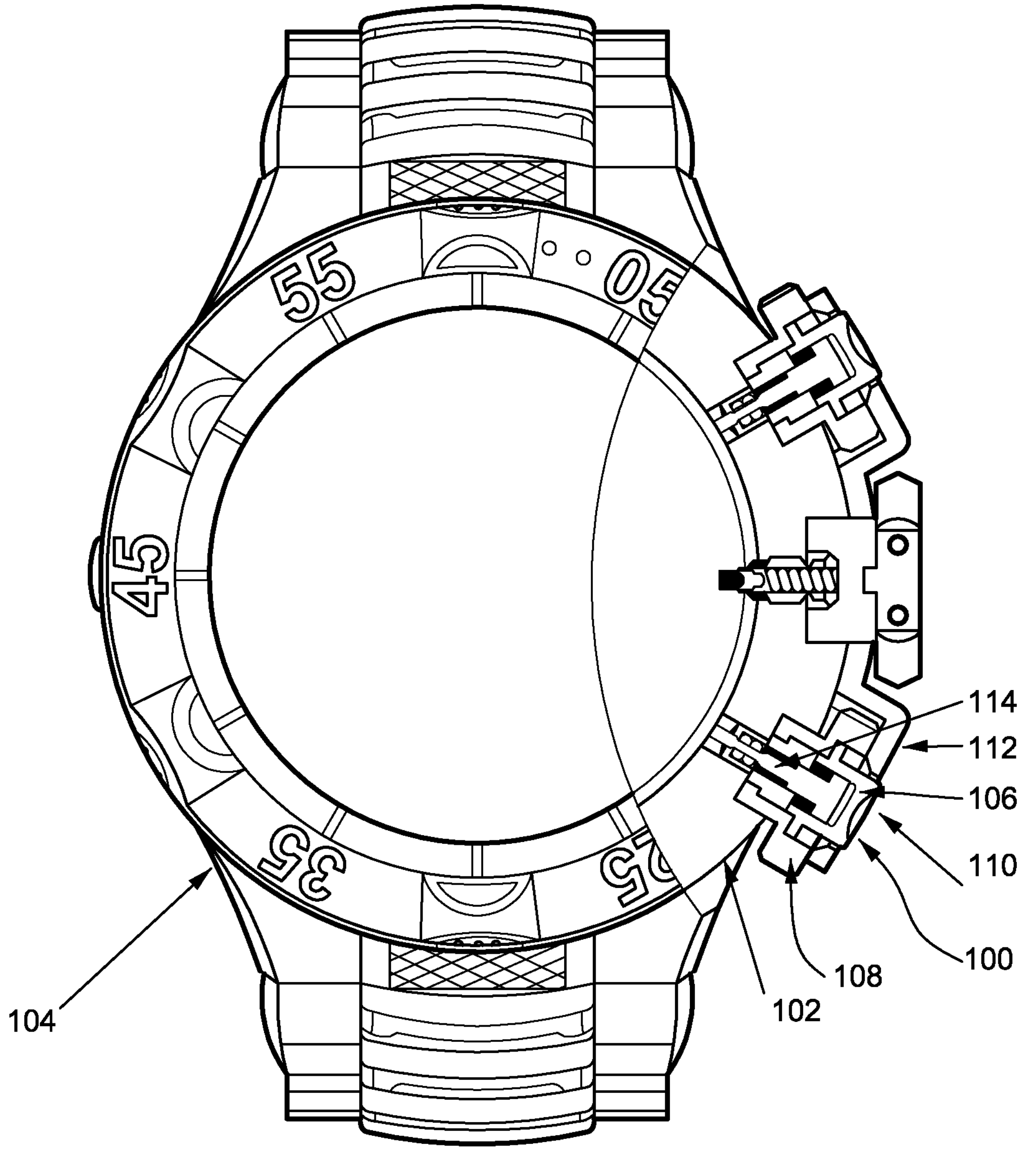
FIG. 1 is a front view of an interface for actuating a device implemented on a wrist watch in accordance with one embodiment of the present invention.

Referring to FIG. 1 there is illustrated an embodiment of an interface for actuating a device comprising: a boss member arranged to be extended from a shaft to receive a user's manipulation, wherein when the boss member receives the user's manipulation, the boss member is arranged to project the shaft to an actuating position arranged to actuate the device.

In this embodiment, the interface 100 is arranged to be disposed on a wrist watch 104 so as to provide an interface 100 between a user and internal actuators of the watch 104. In FIG. 1, the interface 100 is arranged to operate with a wrist watch 104. However, the interface 100 may also be implemented with or without modification or adapted for use with any other electronic, electric, mechanical or medical device including, but not limited to, mobile phones, personal electronic devices or medical devices, computing devices or any other devices which has one or more actuators for manipulation.

As shown in FIG. 1, the interface 100 is disposed on the housing 102 of a wrist watch 104 such that the interface 100 allows for communications between the components of the wrist watch 104 inside the housing 102 and exterior of the housing 102. Preferably, a boss member 106 and a crown 108 which forms part of the external arrangement 110 of the interface 100 are disposed adjacent to the exterior of the housing 102 so as to provide an arrangement 110 for user manipulation. In this example, the housing 102 includes an optional cover 112 which partially covers the crown 108 so as to provide additional protection to the external arrangements of the interface 100.

During operation, the interface 100 is arranged to communicate a user command, such as a user manipulation in the form of digital depression from a user onto an actuator of the watch 104. Preferably, the interface 100 is able to communicate this digital pressure by a resilient projection which projects into the watch to contact with an actuator (not shown) and when the digital pressure is released, the projection is retracted away from the watch actuator.

Preferably, the interface 100 includes a crown 108 which is in communication with a boss member 106. In turn, the boss member 106 is engaged with a shaft 114 arranged to resiliently project through a watch housing 102 so as to communicate with a watch actuator. Further details describing the boss member 106, the crown 108 and the shaft 114 is described below with reference to FIGS. 2A, 2B and 2C.

Figure 2A:
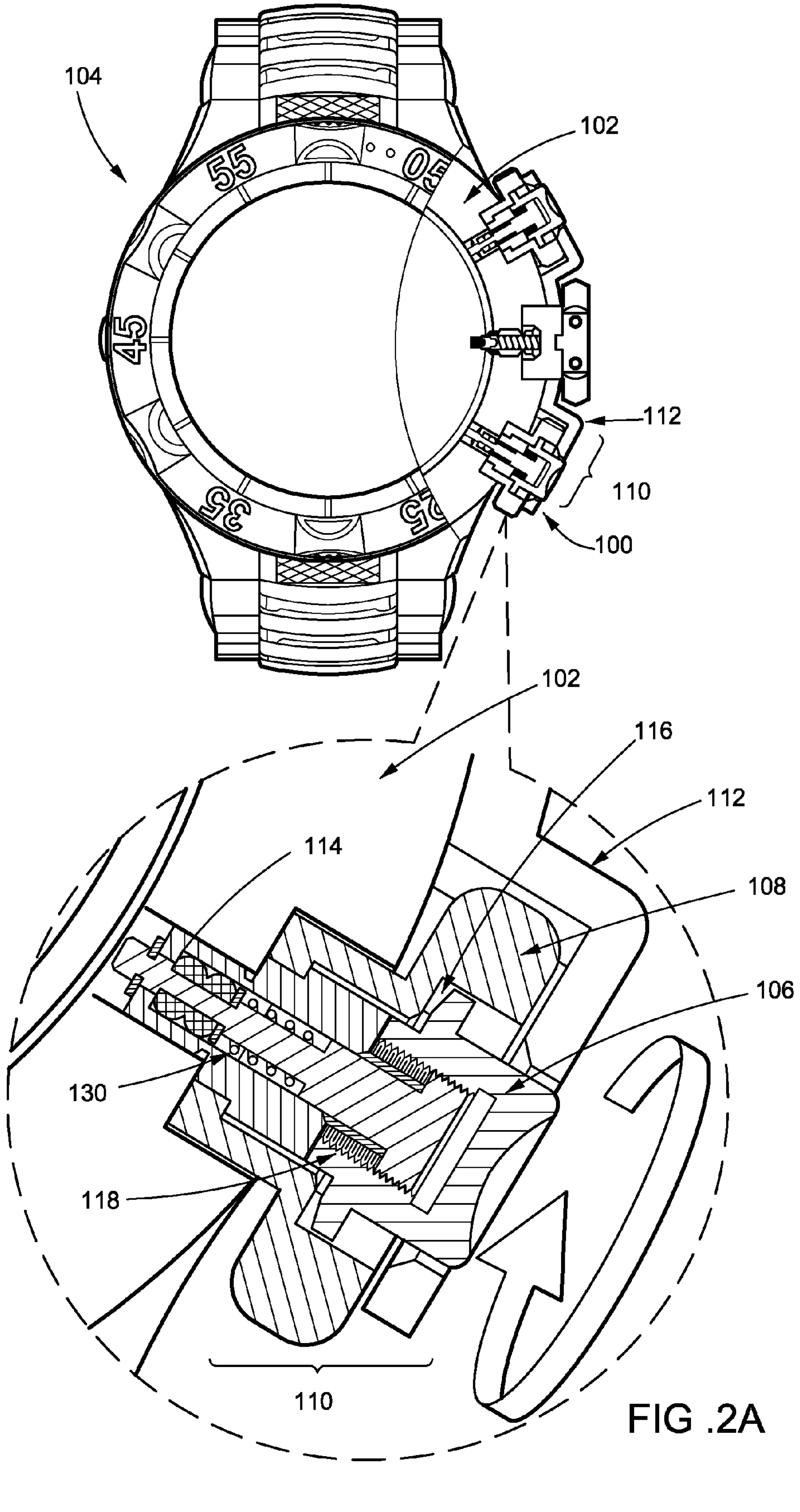
FIG. 2A is an exploded view of the interface of FIG. 1 when the crown is manipulated by a user.
Figure 2B:
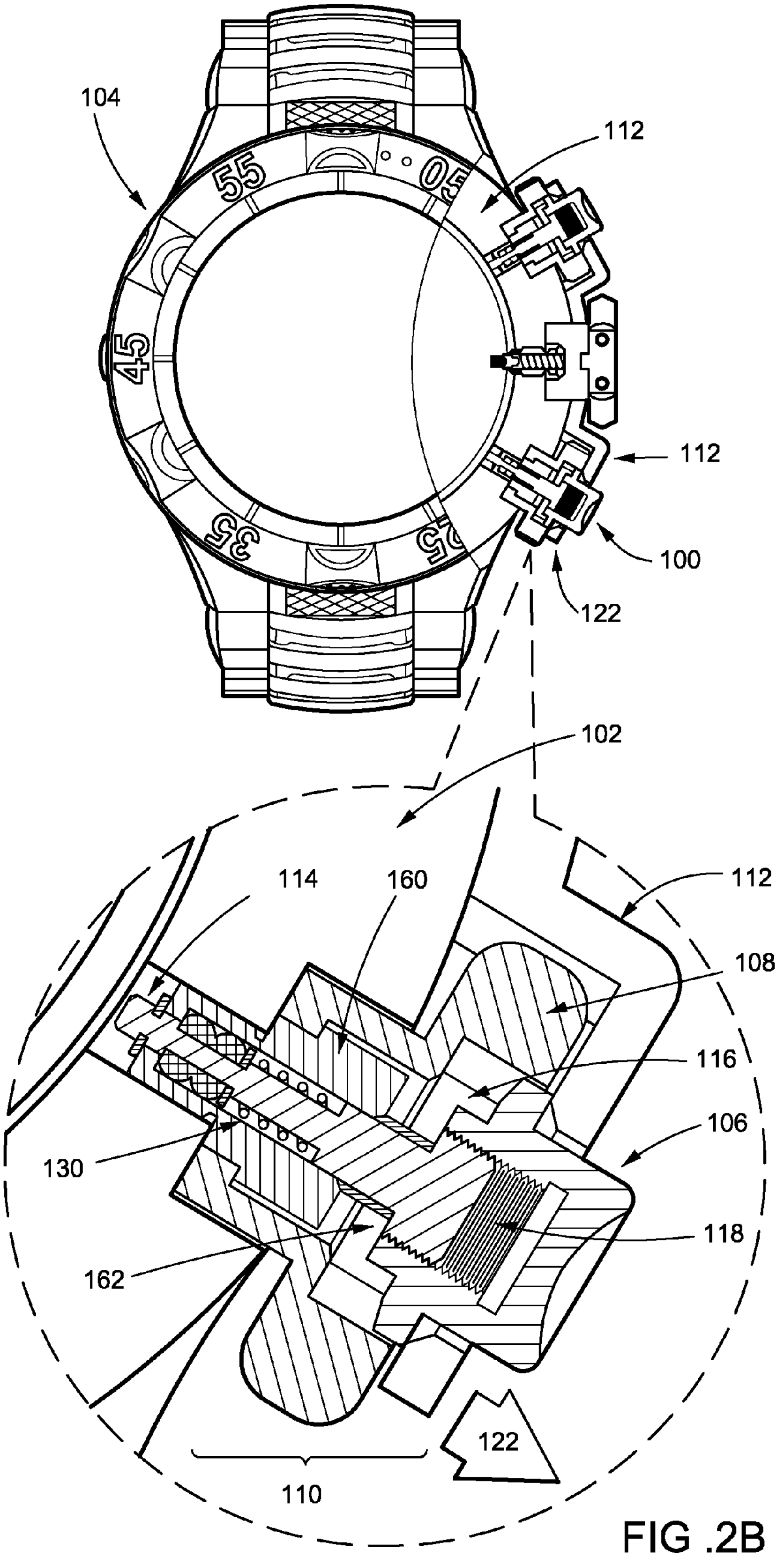
FIG. 2B is an exploded view of the interface of FIG. 1 when the boss member is in an initial position after the crown has been manipulated by a user.
Figure 2C:
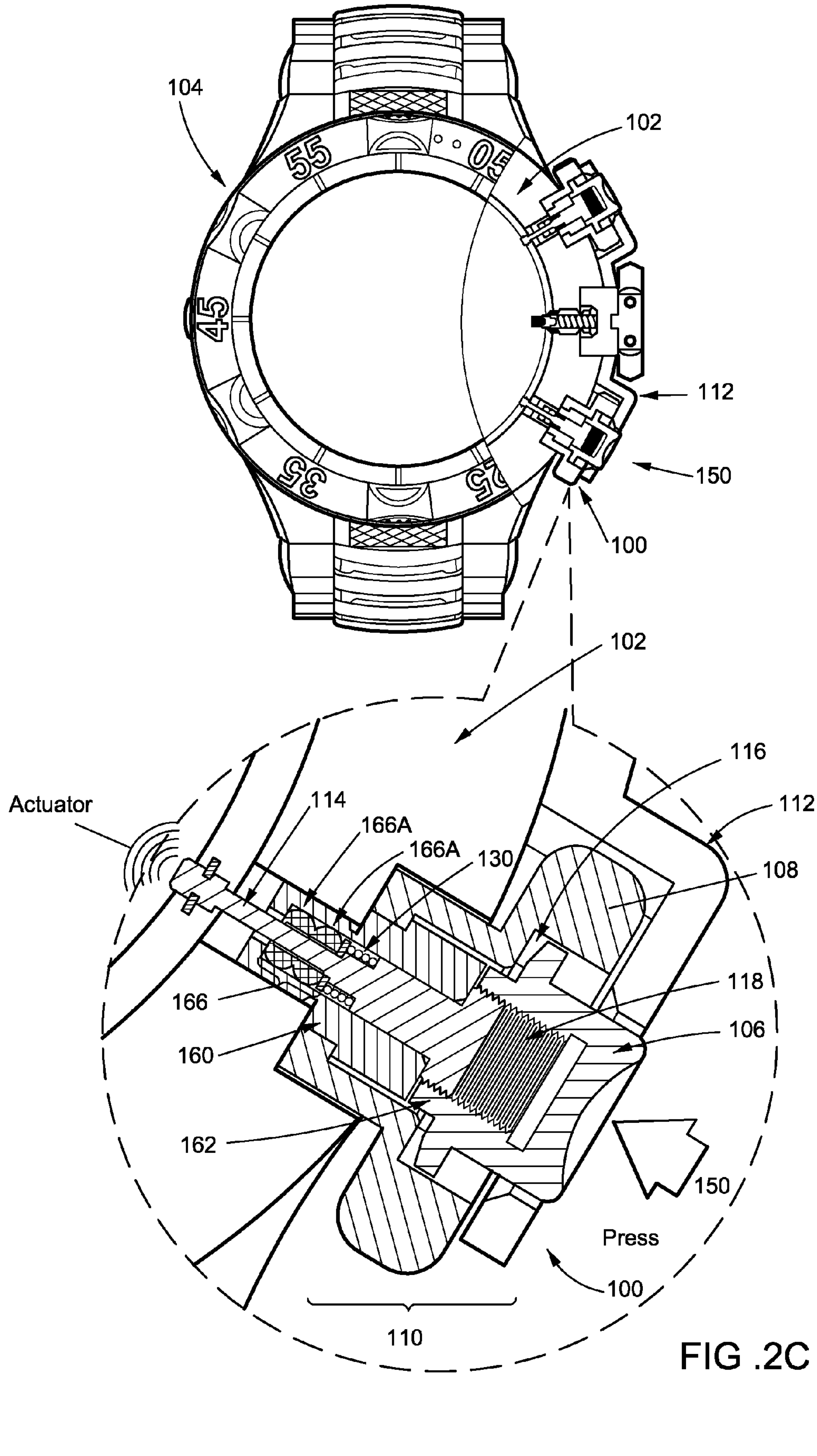
FIG. 2C is an exploded view of the interface of FIG. 1 when the shaft is in an actuating position.

With reference to FIGS. 2A, 2B and 2C, a cut away cross sectional view of an embodiment of the interface 100 as implemented within the wrist watch housing 102 is shown. In this embodiment, the crown 108 is an annular member which is snugly seated into the watch housing 102. The crown 108 also surrounds snugly an annular boss member 106 and preferably, the crown 108 is arranged to drive and rotate the boss member 106 when the crown 108 is rotated in any one direction. The operational arrangement between the crown 108 and the boss members 106 may be implemented by numerous methods, but preferably, the boss member 106 includes an annular plastic or rubbery ring seal disposed between the crown 108 and the boss member 106. This seal in turn increases the friction between the crown 108 and the boss member 106 such that a rotation of the crown 108 will drive the boss member 106 to rotate whilst also allowing the boss member 106 to be translated along the axis of rotation of the crown 108 and boss member 106 so that the boss member 106 may be projected or retracted during the operation of the interface 100. In other examples, the boss member 106 may be made from a high friction material or coated with a high friction material so that the boss member 106 itself will form the necessary friction requirements to be rotated by the crown 108 during use.

In the embodiments shown, the boss member 106 is also engaged to a shaft 114 such that when the boss member 106 is rotated, the boss member 106 extends from the shaft 114 to create a cavity 116 between the boss member 106 and the crown 108. In this process, the shaft 114 and the boss member 106 is thereby extended when the crown 108 is rotated by the user such that the boss member 106 protrudes from the interface 100 and further protrudes to the exterior of the housing 102. Once in this protruded position, the boss member 106 is arranged to receive digital pressure from a user. Preferably, this digital pressure is the pressing action of the boss member 106 in the opposite direction to the protrusion. Once the boss member 106 receives this digital pressure, the pressure is transmitted to the shaft 114 and as a result, the shaft 114 is translated into an actuating position 116. This position may include a penetration of the housing 102 to contact or apply pressure to an actuator or invoke an electromagnetic interference with an actuator within the housing 102 of the wrist watch.

As shown in FIGS. 2A, 2B and 2C, the boss member 106 is engaged to the shaft 114 by a screw/thread arrangement 118 which is similar in operation to thread arrangements of a jack screw. This screw/thread arrangement 118 allows the boss member 106, when driven to be rotated by the crown 108, to be extended from the shaft 114 as the thread arrangement of the boss member 106, when operating with the shaft's thread arrangement causes the entire screw thread arrangement 118 to expand so that the boss member 106 is translated along the boss member's rotational axis. As shown in FIG. 2B, the result of this translation of the boss member 106 relative to the shaft 114 is that a cavity 116 defined by the boss member 106 and the crown 108 expands. By increasing the volume of this cavity 116, the space allows the boss member 106 to be depressed into the cavity 116 which in turn allows the boss member 106 and the engaged shaft 114 to be translated towards the interior of the wrist watch housing 102. This action is clearly shown with reference to FIG. 2C.

Once the boss member 106 is depressed into the cavity 116 by a user's digital pressure, the shaft 114 is then driven into the housing 102 and thus causes the shaft 114 to move towards the interior of the housing 102. Preferably, this is the actuating position 150 of the wrist watch or any other suitable device whereby the actuators of the wrist watch or other suitable device is actuated. The movement of the shaft 114 is preferably resilient so that when the digital pressure is removed from the boss member 106, both the shaft 114 and the boss member 106 return to the initial position 122 whereby the boss member 106 protrudes from the housing 102. As shown in FIGS. 2A, 2B and 2C, the resilience in the shaft and boss member may be provided by a spring 130 which can be positioned in a suitable position to provide resilience to the shaft 114 and boss member 106. In other examples, an alternative resilient structure may be used to return the shaft 114 to the initial position 122.

When the shaft 114 is driven through the housing 102 to its actuating position 150, the actual position of the shaft 114 may vary depending on the design of the device in which the interface 100 is implemented. In the examples shown in FIGS. 1, 2A, 2B and 2C, the actuating position 150 requires that the shaft 114 penetrates the housing 102 so as to contact an actuator (not shown). In some other examples, the shaft 114 may be required to apply a physical pressure to an actuator, whereas in another example, the shaft 114 does not need to penetrate the housing 102, but may simply apply a gentle pressure to an actuator within the interior of the housing 102 through a waterproof membrane disposed between the shaft 114 and the actuator of the device. In yet another embodiment, particularly where the actuators of the wrist watch or other device operates on capacitative switching, which operates by detecting a change in electrical current or electrical capacitance of a switch, the shaft 114 may simply touch or become proximal to a capacitative switch so that the capacitance or electrical field of the switch is altered. In these examples, it is preferable, that the shaft 114 and/or the boss member 106 are made from a electrically conductive material which provides a grounding effect or field altering effect when a user manipulates the boss member 106.

In the example embodiments illustrated in FIGS. 1, 2A, 2B and 2C, the interface 100 further includes an seat 160 arranged to abut against the housing 102 so as to provide a detent arranged to abut against a shoulder 162 of the shaft 114 during use. This seat 160, which is preferably annular, is advantageous in that it is able to stop the shaft's penetration into the housing 102 which in turn protects the actuators within the housing 102 from damage by excess force applied by a user on the boss member 106. In addition, the seat 160 also provides a barrier to resist debris or liquids from entering the housing 102 through the interface 100.

As shown in FIGS. 1, 2A, 2B and 2C, the interface further includes a water resistant arrangement 166 to resist liquids or debris from entering the housing through the interface. As shown in the examples illustrated by FIGS. 1 to 2C, the arrangement includes a series of plastic O-rings 166A which form a snug water resistive barrier between the housing 102 and the shaft 114.

Once the user releases the digital pressure from the boss member 106, the resilient arrangement 130 within the interface 100 forces the boss member 106 to return to its initial position 120 which in turns withdraws the shaft 114 from the actuator whilst returning the boss member 106 to protrude from the housing. At this point, the user can repeatedly apply digital pressure onto the boss member 106 if the user desires to further manipulate the interface 100 to issue additional commands to the watch or other device. However, when the user has completed his or her manipulation procedure, the user may rotate the crown 108 in a locking direction (opposite to the release direction) which in turns, rotate the boss member 106 to withdraw the boss member 106 from the initial position 120 into the housing 102 to a parked position.

One or more embodiments of the interface 100 are advantageous in that the interface provides various barriers to resist debris or liquids from entering the housing through the interface. This includes, without limitations, the water resistant arrangement 166 and the snug fit of the boss member 106, crown 108, shaft 114 and seat 160 within the interface 100 which all act as various barrier layers to resist foreign debris or liquids from entering the housing 102 whilst permitting actuators from within the housing to be manipulated by a user's digital pressure.

In the following embodiments, the interface for actuating a device is in the form of an actuator for a device.

Figure 3:
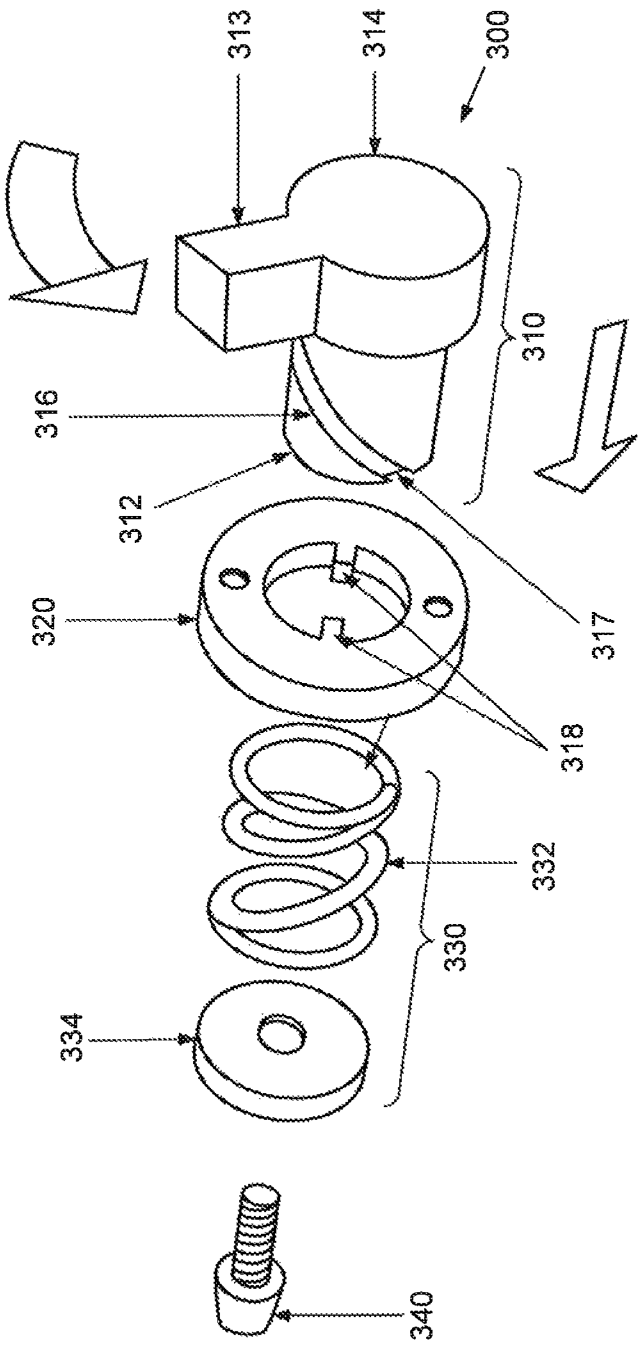
FIG. 3 is an exploded view of an actuator for a device in accordance with a second embodiment of the present invention.

FIG. 3 illustrates another embodiment of the actuator of the present invention. In this embodiment, the actuator 300 comprising a boss member 310 adapted to engage the device, the boss member 310 having a cylindrical body portion 312 and a handle portion 314, the body portion 312 comprising at least one channel 316 engageable with a guiding plate 320 connected with the device, wherein upon manipulation of the handle portion 314, the boss member 310 is movable from an initial position to an actuating position whereby an actuating member 340 is adapted to actuate the device.

In this embodiment, the actuator 300 is to be disposed on a housing of a wrist watch such that the actuating member 340 allows actuation of the watch by a user. Preferably, a boss member 310 forms part of the actuator 300 and comprises a cylindrical body portion 312 and a handle portion 314. The cylindrical body portion 312 may be connected with the handle portion 314. Alternatively, the cylindrical body portion 312 can be integrally formed with the handle portion 314.

Preferably, the handle portion 314 comprises a projecting structure which can be in the form of, for example, a lever 313. The lever 313 facilitates an easy and convenient grabbing of the handle portion 314 for the manipulation by the user when an actuation to the wrist watch is desired. The actuating action is to be applied onto the lever 313 of the handle portion 314 of the boss member 310, which can be in the action of, for example, rotating, pushing or pulling of the lever 313.

The body portion 312 includes at least one channel 316 which engages at least one guiding member 318 of a guiding plate 320. As illustrated in FIG. 3, the channel 316 can be configured in the form of a steep thread starting from the bottom edge 317 of the body portion 312, extending circumferentially along the cylindrical surface of the body portion 312, and away from the guiding plate 320. The channel 316 can be configured in the form of an arc (i.e. a part of a full circle), a full circle or extend beyond a full circle such as a helical structure.

It is also shown in the figure that the guiding plate 320 can be in the form of a fixer plate and that the guiding member 318 can be in the form of a pair of teeth structures integrally formed with the fixer plate adapted to be received by the corresponding pair of channels 316 (although only one channel is shown in the figure). The guiding plate 320 is for the purpose of guiding the sliding movement of the boss member 310 between the initial position and the actuating position along the channel 316. The movement allows the boss member 310 to move towards the guiding plate 320 and thus the wrist watch so as to facilitate the actuation of the wrist watch. For the specific embodiment as shown in the figure, the guiding plate 320 can be attached to the wrist watch or housing of the wrist watch via a fastener such as a screw. Alternatively, the guiding plate 320 can be integrally formed with the wrist watch or housing of the wrist watch.

Specifically, actuating of the wrist watch by means of the actuator 300 by the user can be achieved by steps of: grabbing of the lever 313 by the user, followed by pulling of the lever 313 by the user in a direction transverse to the longitudinal axis of the body portion to rotate the boss member 310 by approximately 30 degrees to degrees, and more specifically, by approximately 60 degrees, thereby moving the boss member 310 from the initial position to the actuating position so as to actuate the wrist watch.

Figure 4:
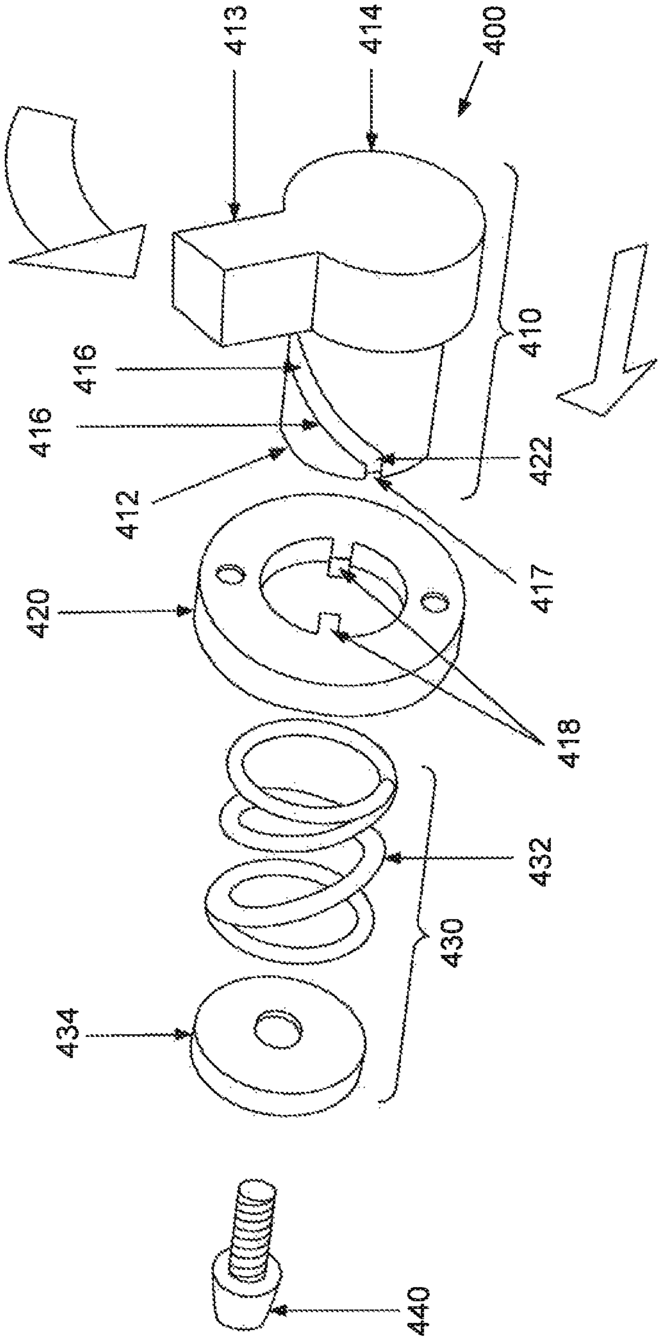
FIG. 4 is an exploded view of an actuator for a device in accordance with a third embodiment of the present invention.

FIG. 4 illustrates a further embodiment of the present invention. As shown in the figure, the body portion 412 of the boss member 410 of the actuator 400 includes channel 416 which composes of a slit portion 422 and a thread portion 424. The slit portion 422 extends longitudinally, starting from the bottom edge 417 along the cylindrical surface of the body portion 412 and away from the guiding plate 420 or the wrist watch. While the thread portion 424 can be in the form of a steep thread continue extending from the end of the slit portion 422, and further extending circumferentially along the cylindrical surface of the body portion 412 and away from the guiding plate 420. The slit portion 422 and the thread portion 424 connect and are of spatial communication with each other, allowing the received guiding members 418 to be capable of slidably movable along the slit portion 422 and then the thread portion 424.

Specifically, actuating of the wrist watch by means of the actuator 400 by the user can be achieved by steps of: grabbing of the lever 413 by the user, pushing of the lever 413 towards the guiding plate 420 and thus the wrist watch so as to force the guiding members 418 in moving along the slit portion 422, and then pulling of the lever 413 by the user in a direction transverse to the longitudinal axis of the body portion to rotate the boss member 410 by approximately 30 degrees to 90 degrees, and more specifically, approximately 60 degrees, thereby moving the boss member 410 from the initial position to the actuating position so as to actuate the wrist watch.

As shown in FIGS. 3 and 4, the actuator 300/400 further includes a biasing member 330/430 for restoring the boss member 310/410 from the actuating position to the initial position when the manipulation of the user is removed, i.e. moving of the boss member 310/410 away from the guiding plate 320/420 and thus the wrist watch. Preferably, the biasing member 330/430 includes a resilient structure 332/432 such as a spring. The biasing member may also include a base 334/434 for holding the resilient structure 332/432 and withstanding the biasing force. The base 334/434 can be in the form of, for example, a washer.

As shown in FIGS. 3 and 4, the actuator 300/400 further includes an actuating member 340/440 engaged with the body portion 312/412 thereby actuating the wrist watch when the boss member 310/410 is in the actuating position. The actuating member 340/440 may be in the form of a button screw as shown in the figures, which actuates the wrist watch when the boss member 310/410 is in the actuating position. The actuating member 340/440 may also facilitate holding of the different parts of the actuator 300/400 together.

Figure 5:
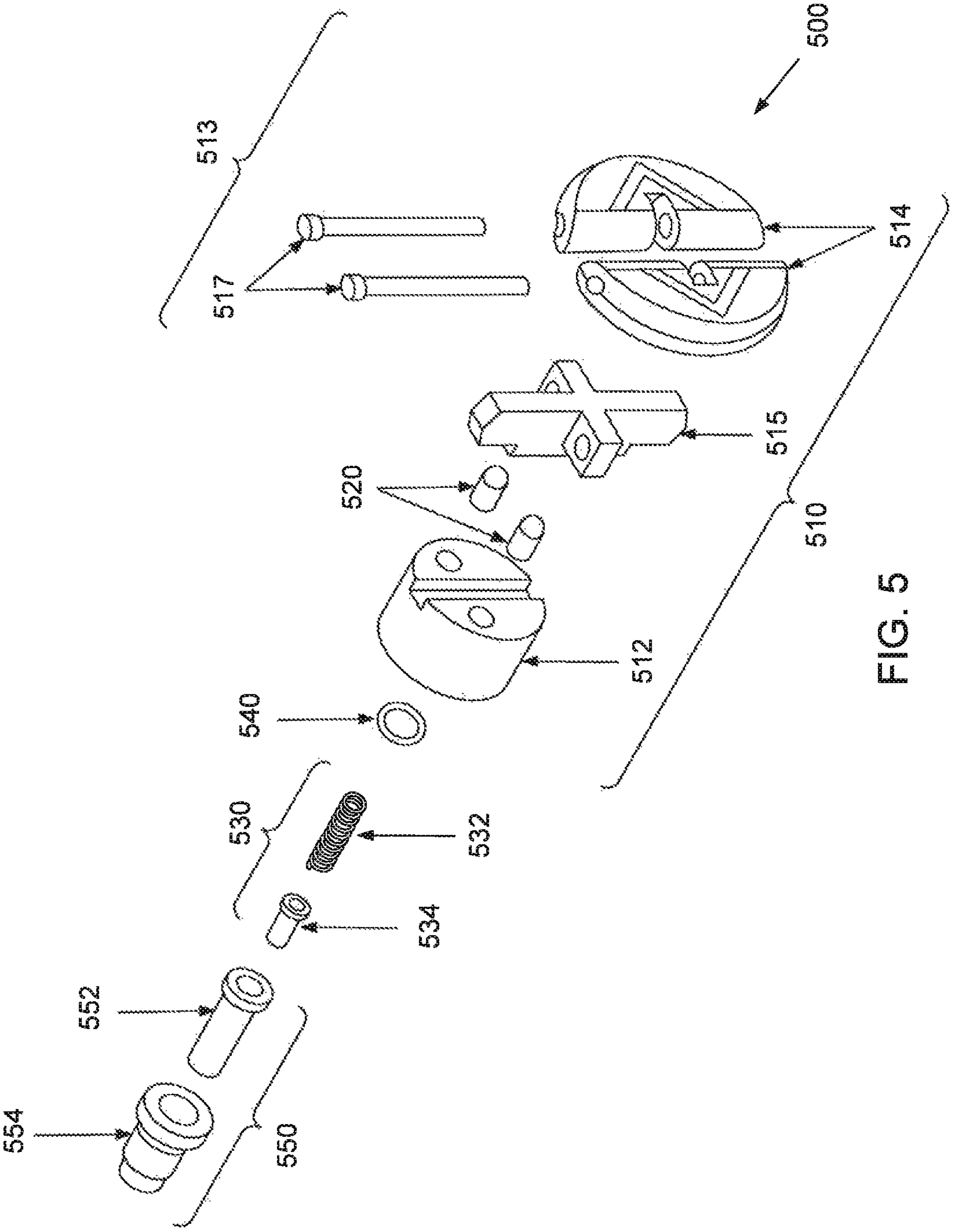
FIG. 5 is an exploded view of an actuator for a device in accordance with a fourth embodiment of the present invention.

FIG. 5 illustrates a further embodiment of the present invention. In this embodiment, the actuator 500 comprises a boss member 510 adapted to engage the device, the boss member 510 having a body portion 512 and a handle portion 513, the handle portion 513 comprising at least one wing member 514 movable between a first configuration in which the at least one wing member 514 is in proximity to the device, and a second configuration in which the at least one wing member 514 is extending away from the device, wherein upon manipulation of the at least one wing member 514 when in the second configuration, the boss member 510 is movable from an initial position to an actuating position whereby an actuating member 550 is adapted to actuate the device.

The actuator 500 can be disposed on a housing of a wrist watch such that the actuator 500 allows actuation of the wrist watch by a user. An embodiment of the actuator 500 as implemented on a wrist watch is illustrated, in the form of an exploded view, in FIG. 6.

Figure 6:
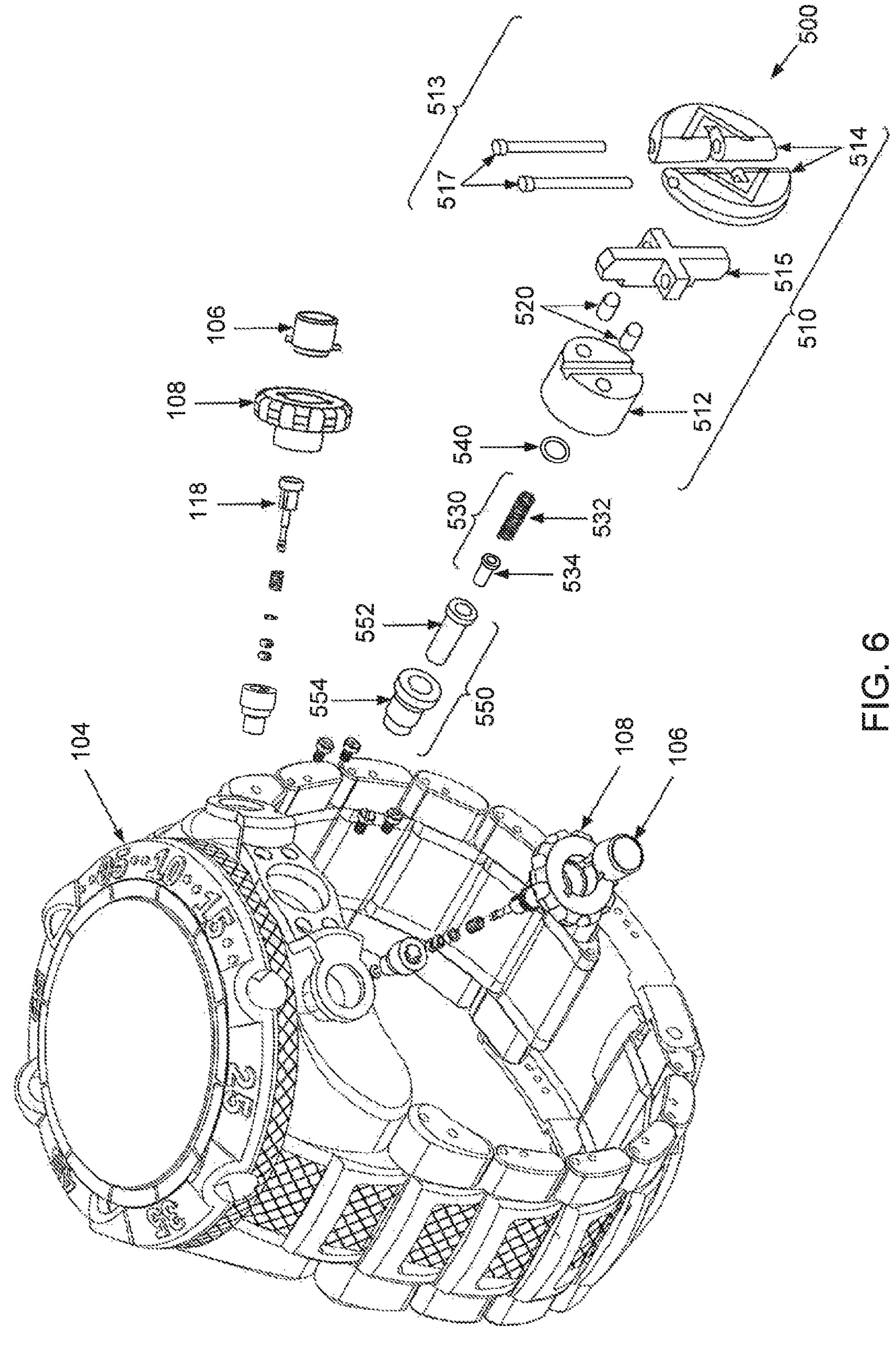
FIG. 6 is an exploded view of the actuator of Figure implemented on a wrist watch in accordance with one embodiment of the present invention.

Referring to FIGS. 5 and 6, it is shown that the boss member 510 includes a body portion 512 and a handle portion 513. In this embodiment, the handle portion 513 includes a pair of wing members 514 pivotedly connected with the body portion 512 via a pivot joint. Preferably, the pivot joint connecting the wing members 514 and the body portion 512 is a lever hinge 515, which connects the wing members 514 via a pair of screws 517. Preferably, the wing members 514 are in the form of a pair of crown levers and the body portion 512 is in the form of a crown base.

Figure 7:
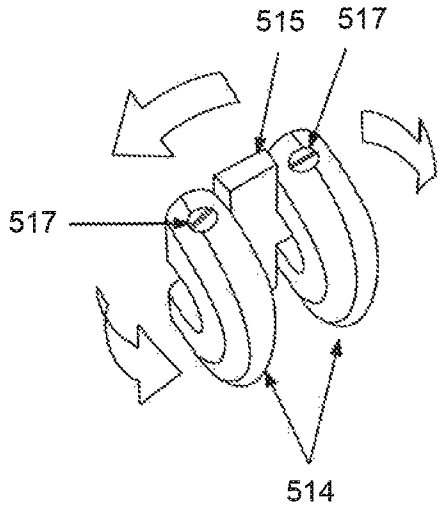
FIG. 7 is a perspective view of the handle portion of the embodiment of FIG. 5.

In this specific embodiment as illustrated in FIGS. 5 and 6, the wing members 514 are movable between a first configuration in which the wing members 514 are arranged substantially coplanar with the body portion 512, and a second configuration in which the wing members 514 are projecting substantially transverse to the body portion 512, as shown in FIG. 7. Alternatively, the wing members 514 may be arranged substantially coplanar with the wrist watch when in the first configuration, and may project substantially transverse to the wrist watch when in the second configuration.

Specifically, actuating of the wrist watch by means of the actuator 500 by the user can be achieved by steps of: lifting of the wing members 514 by the user to allow movement of the wing members 514 about the lever hinge 515 so that the wing members 514 are arranged to project substantially transverse to the body portion 512 or the wrist watch, grabbing of the lifted wing members 514 by the user, manipulating the wing members 514 by rotating, pulling or pushing the wing members 514 by the user so that the boss member 510 is movable from the initial position to the actuating position so as to actuate the wrist watch.

Preferably, the actuator 500 further includes a detent 520 for limiting movement about the pivot joint connecting the body portion 512 and the wing members 514. Specifically, the detent 520 may comprise at least one ball bearing.

The actuator 500 may also include a biasing member 530 for restoring the boss member 510 from the actuating position to the initial position when the manipulation of the user is removed. Preferably, the biasing member 530 includes a resilient structure 532 such as a spring. The biasing member 530 may also include a spring stabilizer 534 for holding and stabilizing the resilient structure 532.

The actuator 500 further includes a sealing member 540 for resisting liquids or debris from entering the interior of the wrist watch via the actuator 500. As shown in the embodiment as illustrated in FIGS. 5 and 6, the sealing member 540 includes a plastic O-ring which forms a snug water resistive barrier between the boss member 510 disposed at the exterior of the wrist watch, and the interior of the wrist watch.

The actuator 500 also includes an actuating member 550 engageable with the body portion 512 thereby actuating the wrist watch when the boss member 510 is in the actuating position. As shown in the example illustrated in FIGS. 5 and 6, the actuating member 550 includes an internal stem tube 552 receivable by an external stem tube 554 which actuates the wrist watch when the boss member 510 is in the actuating position.

The present embodiments described herein are considered in all respects as illustrative and not restrictive. Persons skilled in the art will appreciate that numerous modifications and/or variations may be made to the invention as shown in the various embodiments. These modifications or variations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub combination.

Any reference to prior art contained herein is not to be taken as an admission that the information is common general knowledge.

The invention claimed is:

1. An actuator for a device comprising:

a guiding member connected with the device, and a boss member rotationally mounted with the quiding member and movable from an initial position towards the device to an actuating position to facilitate actuation of the device, the boss member having a cylindrical body portion, an actuating portion and a handle portion, the body portion rotationally engaged with the guiding member and comprising at least one channel engageable with the guiding member connected with the device for translating rotation of the boss member into movement of the boss member towards the device, and wherein upon rotation of the handle portion the boss member is moved from the initial position towards the device to the actuating position whereby the actuating portion actuates the device.

2. The actuator of claim 1, wherein the at least one channel is adapted to slidably receive at least one guiding member of the guiding plate.

3. The actuator of claim 1, wherein the at least one channel comprises a first channel portion extending circumferentially along a cylindrical surface of the body portion.

4. The actuator of claim 3, wherein the first channel portion extends away from the device.

5. The actuator of claim 3, wherein the at least one channel further comprises a second channel portion extending longitudinally along the cylindrical surface of the body portion, the second channel portion is in spatial communication with the first channel portion.

6. The actuator of claim 1, wherein the guiding plate is integrally formed with the device.

7. The actuator of claim 1, wherein the handle portion comprises a lever.

8. The actuator of claim 1, further comprising a biasing member for restoring the boss member from the actuating position to the initial position.

9. The actuator of claim 1, wherein the actuating member engages the body portion thereby actuating the device when the boss member is in the actuating position.

* * * * *